Nov. 15, 1932.                F. BUCK                1,888,069
                           FEELER GAUGE
                        Filed April 20, 1931
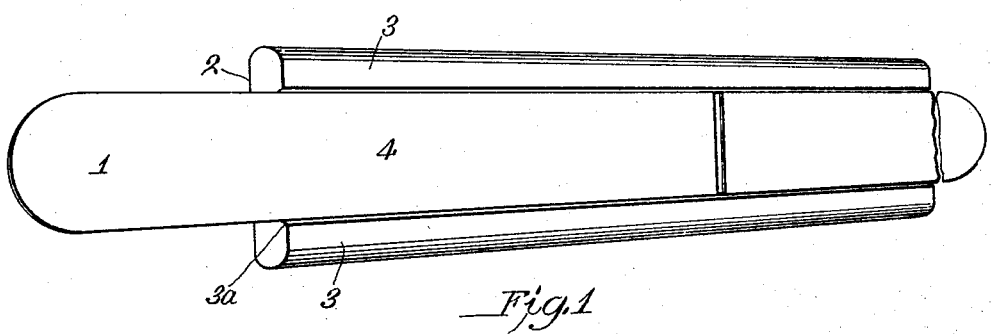
Fig.1
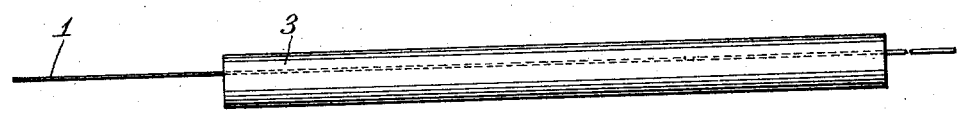
Fig.2.
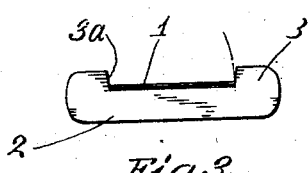    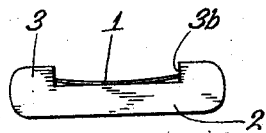
Fig.3.                  Fig.4.
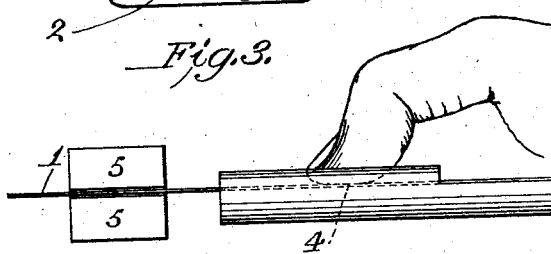
Fig.5.
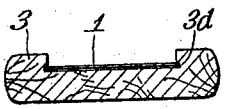
Fig.6.
INVENTOR
FRED BUCK
BY George B. Willcox
ATTORNEY Patented Nov. 15, 1932

1,888,069

UNITED STATES PATENT OFFICE

FRED BUCK, OF SAGINAW, MICHIGAN, ASSIGNOR TO LUFKIN RULE CO., OF SAGINAW, MICHIGAN, A CORPORATION OF MICHIGAN

FEELER GAUGE

Application filed April 20, 1931. Serial No. 531,396.

This invention relates to thickness or feeler gauge holders and has for its object to provide a convenient handle for the gauge-stock strip while in use.

An object of the invention is to provide a handle so constructed that a gauge-stock strip mounted therein will present an exposed area of its surface upon which the operator's thumb or finger will naturally press, so as to impart directly from the gauge strip itself a reliable and delicate sense of the "feel" of the gauge while being used in the customary way to determine the clearance between two work pieces. Thus precision is attained.

A further object is to provide a handle so constructed as to be applied to the feeler gauge-stock strip by merely placing the gauge strip flatwise on the handle and pressing them together. This structure is in contrast to devices heretofore known wherein the thin strip had to be inserted endwise into a narrow slit in an end of a hollow handle that enclosed the blade so as to prevent adequate finger contact with it, and then had to be clamped by a lever-actuated cam. All of those manipulations required considerable care and were quite inconvenient and distracting, especially when extremely thin and very flexible gauge strips were being used and when the nature of the work required the user to change quickly from a gauge strip of a certain thickness to one of different thickness.

Another object is to produce a feeler gauge handle that has no moving parts for releasably clamping the gauge strip and no mechanism for unfastening it, yet is capable of simultaneously holding two gauge strips of different thickness in their working positions ready for instant use.

With the foregoing and certain other objects in view, which will appear later in the specification, my invention comprises the devices described and claimed and the equivalents thereof.

In the drawing Fig. 1 is a view in perspective of the device, showing two feeler gauges in position for use selectively.

Fig. 2 is an edge view of the parts shown in Fig. 1.

Fig. 3 is an end view.

Fig. 4 is an end view of a modified form.

Fig. 5 is an edge view of a modified form.

Fig. 6 is an end view of a preferred form.

As is shown in the drawing, a feeler gauge, 1, of ribbon or strip metal, accurate as to thickness and of suitable width, usually one half inch, is received in the handle member embodying my invention, an end of the gauge strip projecting beyond the end of the handle. Preferably the handle comprises a single piece of any suitable material, such as for example, wood, metal, bakelite, vulcanized rubber, fibre or the like. It is in the general form of a flat bar of appropriate length to provide a hand grip and is formed on one face into a longitudinal channel that is approximately the same width as the feeler strip and in depth is somewhat greater than the thickness of the strip. The bottom wall of the channel presents a flat backing 2 that reinforces the gauge strip against flexing.

Gauge gripping members 3, 3b, as in Fig. 4, define the sides of the groove and are spaced apart appropriately to seize the longitudinal edges of a gauge strip when the strip is inserted in the groove, as above described, by pressing it in flatwise. The members 3 may be continuous for the length of the handle, or they may be interrupted, as shown at 3c in Fig. 5.

This invention is characterized by the fact that the clamping action which holds the gauge strip in place in the handle is exerted against the two longitudinal edges of the gauge strip by the side walls 3b of the members 3, 3c. Various specific devices for attaining the clamping action are within the scope of the invention claimed and certain of them will now be described.

In Fig. 6, which is deemed a preferred form on account of its lightness and low cost of manufacture, the handle is represented as made of wood, the groove being slightly narrower than the gauge strip so that the strip when pressed flatwise into place in the handle will embed its longitudinal edges slightly in the wood at the bottom of the groove, in the manner indicated at 3d, and will be held in place with sufficient firmness by the natural resilience of the yieldable wood fibres. In this case the flexibility of the material of the handle is depended upon to produce the transverse clamping action.

In the form shown in Fig. 3 the material of the handle is not yieldable to the gauge strip and the walls 3a are made with a slight outward and upward bevel to permit the strip 1 to be forced in the manner of a wedge to fit accurately between them when pressed downward to the bottom of the groove, as indicated by the broken line.

In the form shown in Fig. 4 the width of the groove is slightly less than the width of the strip 1 and the latter is held by being slightly bowed or sprung in a transverse direction. The walls 3b of the groove may be either in parallel planes as shown, or slightly beveled as in Fig. 3, and the material of the handle may be yieldable, as in Fig. 6, or rigid as described for Fig. 3. In this form the gripping action upon the walls of the groove is produced primarily by the resilience and bowing of the stock strip itself.

When using the device, the operator grasps the handle, and with finger or thumb presses as at 4 upon the exposed face of the strip. He then tries the fit of the gauge strip 1 between two pieces of work, as indicated at 5, 5. An important advantage of this method of holding a gauge strip is that the operator's finger when pressing directly upon the gauge strip is extremely sensitive to the "feel" of the gauge and there is imparted to him by such delicacy of "feel" a most accurate sense of precision as to the closeness of the fit of the strip between the work pieces. Such delicacy of operation is not possible where the entire strip is enclosed and, as it were, masked by the handle so as to prevent direct contact of the operator's hand with the strip itself.

By the means above described I have produced a handle for feeler gauge strips that is light, has no levers or other projecting parts and, therefore, can be conveniently carried in the user's pocket and is of such shape that it can be conveniently made of wood moulding pieces, cut to length, and is so inexpensive that it can be given away with each purchase of gauge stock strips.

Having thus described my invention, what I claim and desire to secure by Letters Patent is:

1. In combination a feeler gauge strip, a handle member having a face thereof formed with a channel the width of which is defined by longitudinally disposed rib members, the opposite walls of said rib members being spaced apart to receive said gauge strip between them with a face thereof exposed, said walls being positioned to engage the longitudinal edges only of said strip in a manner to releasably secure the strip and handle together, for the purposes set forth.

2. In combination a feeler gauge strip, a handle member having a face thereof formed with a channel the width of which is defined by longitudinally disposed members, the opposite walls of said rib members being of yieldable material and spaced apart to receive said gauge strip between them with a face thereof exposed, said walls being positioned closer together than the width of the strip so as to cause the longitudinal edges only of said strip to embed in the said walls and thereby releasably secure the strip and handle together, for the purposes set forth.

3. In combination a feeler gauge strip, a handle member having a face thereof formed with a channel the width of which is defined by longitudinally disposed rib members the opposite walls of said rib members being spaced apart approximately the width of the strip to receive said gauge strip between them with a face thereof exposed, said walls being unyieldable and positioned so as to engage, by wedge action, the two longitudinal edges only of said strip.

4. In combination a feeler gauge strip, a handle member having a face thereof formed with a channel the width of which is defined by longitudinally disposed rib members the opposite walls of said rib members being spaced apart to receive said gauge strip between them with a face thereof exposed, said walls being unyieldable and positioned closer together than the width of the gauge strip so as to slightly bow the strip transversely when the latter is inserted flatwise in the channel and to releasably hold the bowed strip by engagement of its longitudinal edges.

In testimony whereof, I affix my signature.

FRED BUCK.